(12) United States Patent
Sparenborg et al.

(10) Patent No.: US 7,308,337 B2
(45) Date of Patent: Dec. 11, 2007

(54) CRANE INSTALLATION, IN PARTICULAR CONTAINER CRANE

(75) Inventors: Ernst Sparenborg, Delmenhorst (DE); Jorg Meyer, Bremen (DE); Uwe Meyer, Elsdorf (DE)

(73) Assignee: Siemens Aktiengesellschaft, München (DE)

( * ) Notice: Subject to any disclaimer, the term of this patent is extended or adjusted under 35 U.S.C. 154(b) by 381 days.

(21) Appl. No.: 11/043,026

(22) Filed: Jan. 25, 2005

(65) Prior Publication Data

US 2005/0247656 A1 Nov. 10, 2005

Related U.S. Application Data

(63) Continuation of application No. PCT/DE03/02448, filed on Jul. 21, 2003.

(30) Foreign Application Priority Data

Jul. 25, 2002 (DE) ................. 102 33 873

(51) Int. Cl.
*G06F 19/00* (2006.01)
(52) U.S. Cl. .............. 700/245; 700/9; 212/273; 212/276; 212/285; 212/286; 212/319; 701/23; 701/50; 701/213; 342/357.1; 342/357.17; 294/81.1
(58) Field of Classification Search ............... 700/245, 700/9; 212/273, 276, 285, 286, 319; 701/23, 701/50, 213; 342/357.1, 357.17, 281.1
See application file for complete search history.

(56) References Cited

U.S. PATENT DOCUMENTS 1,975,094 A * 10/1934 Fiteh ........................ 212/77
2,620,075 A * 12/1952 Hoyle et al. ............... 212/273
3,826,380 A * 7/1974 Lenander et al. .......... 212/273
3,945,503 A * 3/1976 Cooper ...................... 212/11
5,048,703 A * 9/1991 Tax et al. ................... 212/276

FOREIGN PATENT DOCUMENTS

| DE | 42 35 716 A1 | 5/1993 |
| DE | 43 12 305 A1 | 10/1994 |
| DE | 196 12 423 A | 10/1997 |
| DE | 199 04 893 A | 8/2000 |
| DE | 199 13 279 A1 | 9/2000 |
| EP | 1 298 503 A | 4/2003 |

OTHER PUBLICATIONS

Bartolini et al., Load swing damping in overhead cranes by sliding mode technique, 2000, IEEE, p. 1697-1702.*

(Continued)

*Primary Examiner*—Thomas Black
*Assistant Examiner*—McDieunel Marc
(74) *Attorney, Agent, or Firm*—Henry M. Feiereisen; Ursula B. Day

(57) ABSTRACT

A crane installation, especially a container crane, for moving a load, especially a container, includes a first stored-programmable control unit which, if required, receives signals resulting in a safety-related control command to one or several electric or electro-mechanical operational elements, and a second stored-programmable control unit which is configured in such a way that it can at least partially monitor the control operation of the first control unit on the basis of safety-related signals transmitted to the second control unit. If the safety-related control command of the first control unit is improper, the second control unit is able to issue its own control command to an operating element.

11 Claims, 2 Drawing Sheets

OTHER PUBLICATIONS

Belmans et al., Practical design considerations for braking problems in overhead crane drives, 1993, IEEE, p. 473-479.*

Joshi et al., Position control of a flexible cable gantry crane: Theory and experiment, 1996, Internet, p. 2820-2824.*

Suzuki et al., Semi-Aunomatic control of overhead crane using postential method, 2000, IEEE, p. 3224-3229.*

Al-Lami et al., Microprocessor based crane load state monitoring system, 1991, Internet p. 1183-1186.*

Sterle L A: "Considerations in Applying Programmable Controllers in Safety System Applications", Advances in Instrumentation and Control, Instrument Society of America, Research Triangle Park, US, vol. 45, No. Part 3, 1990 pp. 1295-1304, XP000172075, ISSN: 1054-0032.

Ketteler H et al: "'Smart' Security for Rotary Tower Cranes with ABB Procontic", ABB Review, ABB Asea Brown Boveri, Zurich, CH, No. 3, 1995, pp. 25-30, XP000510176 ISSN: 1013-3119.

* cited by examiner

# CRANE INSTALLATION, IN PARTICULAR CONTAINER CRANE

CROSS-REFERENCES TO RELATED APPLICATIONS

This application is a continuation of prior filed copending PCT International application no. PCT/DE2003/002448, filed Jul. 21, 2003, which designated the United States and on which priority is claimed under 35 U.S.C. §120, and which claims the priority of German Patent Application, Serial No. 102 33 873.6, filed Jul. 25, 2002, pursuant to 35 U.S.C. 119(a)-(d)

BACKGROUND OF THE INVENTION

The present invention relates to a crane installation, such as a container crane.

Nothing in the following discussion of the state of the art is to be construed as an admission of prior art.

Crane installations are typically used for transshipping goods, whereby container crane installations are provided for transfer of large containers of typical size between 20 foot and 45 foot, for example for loading and unloading ships of freight cars etc. Such a crane installation is normally provided with a horizontally displaceable trolley from which a load-carrying device, e.g. a container spreader, is suspended and intended for grabbing a load to be moved. Personnel operating the crane installation or working in proximity of the crane installation are exposed to danger during crane operation and movement of a load, primarily containers of very large dimensions and of a weight of several tons. Therefore, the crane installation is equipped with safety features by which a stored-programmable control unit is able to shut down operation of the crane if required. Examples of such safety features include emergency shutdown, emergency halt, emergency limit switch supervision, pre-limit switch supervision, overload supervision, or overspeed supervision.

However, for a number of reasons, the various proposals are endowed with drawbacks and shortcomings relating for example to manufacturing techniques or to the effect that is hoped to be obtained but may not always be realized.

It would therefore be desirable and advantageous to provide an improved crane installation to obviate prior art shortcomings.

SUMMARY OF THE INVENTION

According to one aspect of the present invention, a crane installation, in particular container crane, for moving a load such as a container, includes an electric or electro-mechanical operating element, a first stored-programmable control unit constructed to receive a safety-relevant signal for controlling the operating element, and a second stored-programmable control unit constructed to at least partially monitor a control operation of the first control unit in response to received safety-relevant signals and to override the first control unit for controlling the operating element, when the first control unit issues an improper control command.

The present invention resolves prior art problems by proposing a crane installation in which the entire control system for the crane is carried out by the first stored-programmable control unit which is constructed to carry out safety-relevant control commands, such as e.g. triggering an emergency halt, when the received signals dictate such action. To implement a safety-relevant shutdown, the second stored-programmable control unit is provided for monitoring the control command of the first control unit. Thus, the second control unit controls whether the first control unit issues correct commands for a shutdown, when the second control unit detects an emergency situation. In the absence of a proper command, the second control unit intervenes to effectuate the shutdown of the involved operating element or operating elements. An improper response by the first control unit can be encountered, when the first control unit receives no or faulty signals or malfunctions.

The second control unit suitably receives only safety-relevant signals that are pertinent for recognition of an emergency situation and possible execution of safety commands for the operating element(s). In general, the second control unit is not intended for executing general control function for the crane installation but is provided to monitor the operation of the first control unit for safety reasons.

The supervision according to the present invention provides a highest degree of safety because a proper control command is ensured in any situation.

According to another feature of the present invention, the first control unit and/or the second control unit may be constructed for effecting a delay in issuing a control command. This may be appropriate because it allows operation of the first and second control units with different cycle times. For example, the first control unit may be constructed to evaluate the signal at a cycle of 40 ms before issuing a command, whereas the second control unit may operate at a cycle of 6 ms and thus leads in its response the first control unit, when recognizing a safety-relevant shutdown situation. In other words, the absence of a proper control command by the first control unit is detected by the second control unit and is inconsequential because of the longer cycle time by which the first control unit operates. The involved operating element thus receives the control command from the second control unit. The delay in response time by the first control unit is long enough to prevent an improper intervention by the first control unit. In addition, the delay—especially when both control units operate in this way—is suitable because the operation of the operating element to be actuated or other cooperating operating elements can still be modified or blocked, such as, e.g. impulses of converters or the like.

According to another feature of the present invention, the first control unit may be constructed for executing a plausibility check of a signal transmitted to the second control unit on the basis of the signal received by the first control unit. In this way, not only is the first control unit monitored by the second control unit but the second control unit is also monitored by the first control unit. Thus, a quasi countercheck is provided to verify whether the safety-relevant signals for the second control unit are plausible and congruent with the signals that are received by the first control unit and form a base for the first safety unit to possibly detect an emergency shutdown. In other words, there is a continuous supervision as to whether the second control unit is in fact capable to recognize an emergency shutdown. Conceivable is a situation in which the second control unit receives faulty safety-relevant signals and thus may recognize the need for an emergency shutoff, when, in fact, this is not the case. Without the provision of such a mutual supervision, this scenario would otherwise result in a sequence in which the first control unit, which has received correct signals, does not detect a situation requiring an emergency shutdown, while the second control unit intervenes and causes a corresponding shutdown of the operating element, even though such action is unwarranted because of the absence of any danger. The provision of a mutual supervision and control feature thus provides a high safety feature.

According to another feature of the present invention, the first and second control units may communicate bidirectionally with one another. In this way, the mutual control possibility and the plausibility check of the signals for the second control unit is further enhanced. In other words, a direct data exchange between the first and second control unit is possible. It is thus possible to execute the plausibility check in such a manner that the first control unit is able to cyclically query the required data or signals from the second control unit. Of course, a unidirectional data exchange is also possible from the second control unit to the first control unit, whereby the second control continuously and cyclically transmits the required data to the first control unit without interrogation.

As described above, the first control unit is suitably constructed for a cyclical plausibility check, with the cycle depending on the general work cycle of the first control unit. Suitable cycle times range between 10 ms and 80 ms, especially between 30 ms and 50 ms, suitably at e.g. 40 ms.

To prevent the issuance of a safety-relevant control command when both control units receive faulty signals that indicate a danger situation, even though this is not the case, it is suitable in accordance with another feature of the present invention to construct the first and second control units for processing at least partially different signals which result in a generation of a same control command. In other words, a possible safety-relevant situation is detected in the first and second control units at least partially on the basis of different signals. It is, for example, conceivable for determining the pre-limit switch signal and the emergency limit switch signal of the first control unit to provide pulses (hereinafter referred to as "movement pulses") along the travel path of the trolley along the crane boom, whereby the first control unit provides a software-base display of the per limit switch signal and emergency limit switch signal for the travel path as established by the movement pulses. In other words, it is computed on the basis of the movement pulses where the trolley is located and whether, for example, the pre-limit switch has just been passed. The second control unit on the other hand receives the switch signals itself, i.e. "real" hardware signal are present there. In the event the pre-limit switch is defective and outputs a signal before the trolley passes by, the second control unit detects this faulty signal which may lead to a control command. As a consequence of the plausibility check, the first control unit recognizes however that the pre-limit switch signal is not plausible and does not correspond to the inputted movement pulse so that the operation of the second control unit is inhibited.

According to another feature of the present invention, the first control unit may be constructed for the plausibility check to execute an operational test of the signal transmitted by the operating element to the second control unit and to generate an output of an error message, if need be. The supervision of the second control unit by the first control unit may involve the provision of a tolerance range about the signaling point within which the signal has to be applied. As the first control unit recognizes in view of the travel path relation when, e.g., the pre-limit switch has been passed by, the pre-limit switch signal has to be within the tolerance range on the second control unit. If this is not the case, an error of the pre-limit switch is registered, regardless whether or not a safety situation is present because the pre-limit switch signal, in view of the possible switch defect, is not triggered or triggered too late compared with the recognized actual position of the switch by the first control unit. The detected error can be displayed to the crane operator.

The safety system can be further enhanced by checking whether one or both control units are in fact operational by constructing the first control unit and/or the second control unit for simulation of a signal that triggers a control command by the second control unit and/or first control unit and for checking a response time of the second control unit and/or first control unit as operational test, when the crane installation is switched on. In this way, possible defects in one or both control units can be detected. In effect, an emergency situation is simulated and a check is undertaken as to whether the respective control unit has switched. If this is the case, the normal control operation continues.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
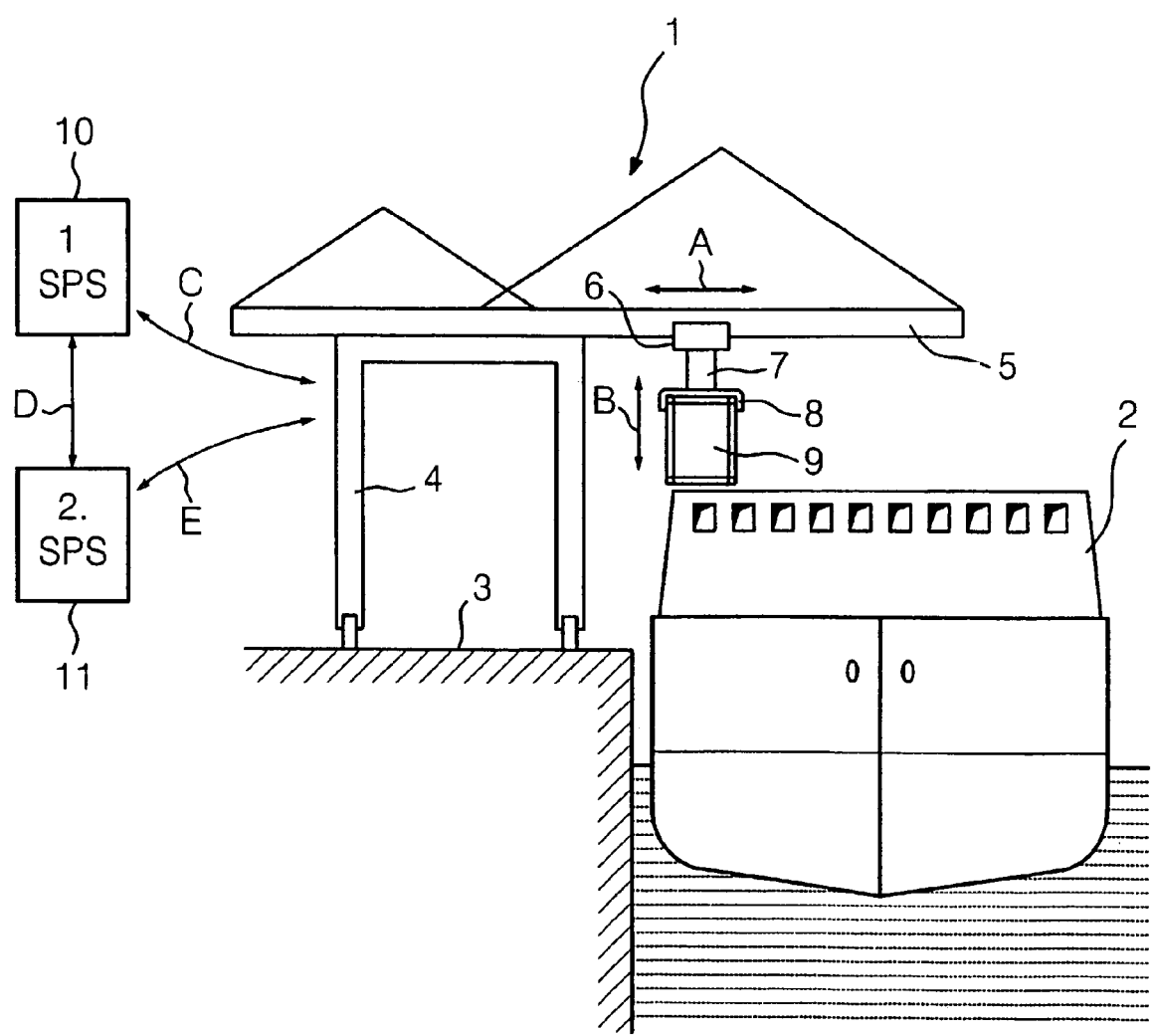
FIG. 1 is a principal illustration of a crane installation according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a principal illustration of a crane installation according to the present invention, generally designated by reference numeral 1, for loading and unloading a transport ship 2. The crane installation 1, e.g. a container crane, is moveable along a quay wall 3 in length direction of the ship 2. The crane installation 1 includes a crane base 4 for support of a boom 5 which extends across the ship 2. A trolley 6 is mounted to the boom 5 for travel along the boom 5, as indicated by double arrow A, and carries via hoist ropes 7 a container spreader 8 which, as shown by way of example in FIG. 1, grabs a container 9, shown by broken lines. The spreader 8 is suspended from the hoist ropes 7 and displaceable vertically by means of a trolley-side hoist mechanism, as indicated by arrow B. The crane installation 1 is intended to unload a container 9 from the ship 2 or to load a container 9 onto the ship 2.

Operation of the entire crane installation 1 is controlled by a first stored-program (SPS) control unit 10 which issues respective control commands to one or more operating elements of the crane, e.g. to the traveling gear of the trolley 6, to the hoist mechanism etc., and receives respective signals from the operating element(s) or other signal-transmitting components (hereinafter referred to in general as "operating element") of the crane installation 1, whereby the control unit 10 acts in response to the signals from the operating element. This bidirectional communication is illustrated in FIG. 1 by double arrow C.

The crane installation 1 further includes a second stored-program (SPS) control unit 11 which in the nonlimiting example of FIG. 1 is in bidirectional communication with the first control unit 10, as indicated by double arrow D. The second control unit 11 is provided for monitoring the operation of the first control unit 10 and for executing a safety-relevant control command to the operating element in the absence of a proper command by the control unit 10. The second control unit 11 receives hereby a safety-relevant signal form the operating element and is capable to issue a control command to the operating element, as indicated by double arrow E, to appropriately control or shut down the operating element.

Figure 2:
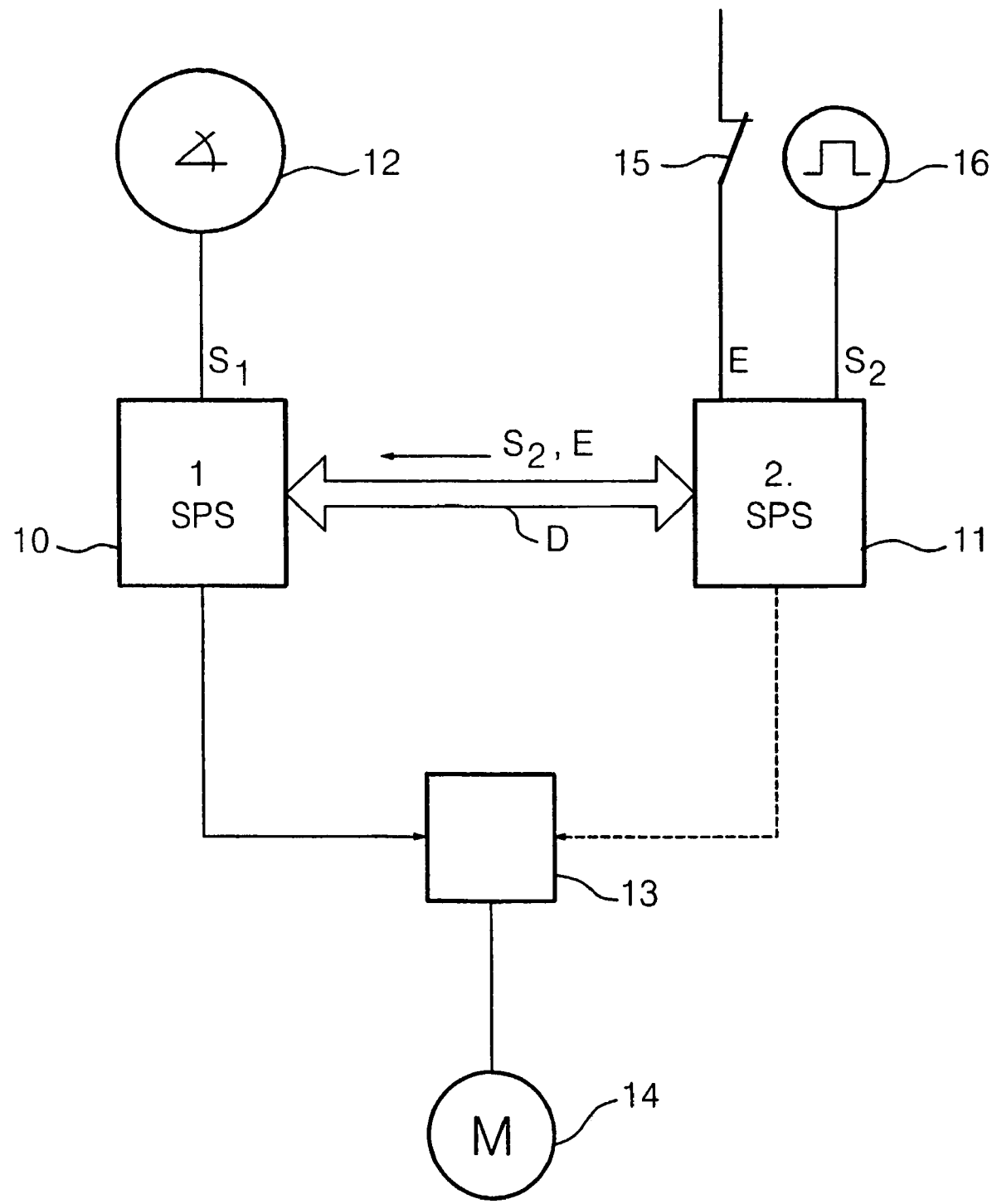
FIG. 2 is a block diagram to show the basic mode of operation of the control units of the crane installation.

Referring now to FIG. 2, there is shown a block diagram to illustrate the basic mode of operation of the control units 10, 11 of the crane installation 1. Described here by way of example is the supervision of a pre-limit switch 15 which is provided at a free end of the boom 5. As the trolley 6 moves in the direction toward the water side and passes the pre-limit switch 15, the first control unit 10 decreases the speed by a predetermined amount, e.g. to a desired speed of 70% of a maximum speed.

In order to detect when the trolley 6 has passed the pre-limit switch 15, a displacement sensor is disposed on the trolley 6 and includes an angle encoder 12 which continuously outputs a displacement signal $S_1$ to the first control unit 10. As a result, the control unit 10 is able to determine the actual position of the trolley 6 on the boom 5. Because the control unit 10 knows also the actual position of the pre-limit switch 15 on the boom 5, the control unit 10 is able to recognize when the trolley 6 moves past the pre-limit switch 15. When this situation is at hand, the control unit 10 instructs an operating element, e.g., a converter 13 which operates a motor 14 of the traveling gear for the trolley 6, to decrease the speed.

The second control unit 11 monitors the first control unit 10, as indicated by double arrow D, and is constructed to detect whether or not the control unit 10 operates properly because the second control unit 11 normally recognizes when the pre-limit switch 15 has been passed by and also knows that the speed needs to be decreased. In order for the control unit 11 to recognize when the pre-limit switch 15 has been passed by, the actual pre-limit switch signal E is transmitted to the control unit 11. So long as the signal E is present, trolley 6 is at a location ahead of the pre-limit switch 15. When the pre-limit switch 15 opens, signal E is no longer present which means that the pre-limit switch 15 has been passed by the trolley 6. In addition, the control unit 11 receives the displacement signal $S_2$ from a pulse generator 16 which enables the control unit 11 to determine the speed of the trolley 6 by forming the time derivation ds/dt. The second control unit 11 is thus able to check whether or not the first control unit 10 has properly decreased the speed as the trolley 6 passes the pre-limit switch 15.

If affirmative, the second control unit 11 does not intervene with respect to the operation of the converter 13. Should, however, the first control unit 10 fail to decrease the speed for whatever reasons, e.g. defective angle sensor 12 or faulty signals outputted by the angle sensor 12, or faulty operation of the first control unit 10 itself, so that a passage of the pre-limit switch 15 by the trolley 6 is not recognized by the first control unit 10, the second control unit 11, recognizing the error, intervenes, as indicated by the dashed arrow, and sends a proper signal to the converter 13.

To prevent a faulty supervision by the second control unit 11 or a faulty supervision as a result of fault input data based on the pre-limit switch signal E and displacement signal $S_2$, the first control unit 10 is so constructed as to be able to monitor the operation of the second control unit 11 by checking whether the inputted signals are plausible and correspond to the determination made by the first control unit 10.

This plausibility check is executed by having the first control unit 10 to examine first whether the signal $S_1$ indicates actual passage of the pre-limit switch 15. If affirmative, the control unit 10 checks whether the pre-limit switch signal E=0. In other words, signal E is no longer present at the second control unit 11 and the pre-limit switch 15 has in fact opened. Furthermore, the control unit 10 checks whether the displacement signal $S_2$ corresponds to the displacement signal $S_1$ present at the first control unit 10 or to the momentary actual speed. If affirmative, the first control unit 10 recognizes the transmission of proper signals to the second control unit 11 so that both control units 10, 11 receive in fact the same information to reach the proper decision.

As shown in FIG. 2, the second control unit 11 transmits the signals E and $S_2$ to the first control unit 11, either automatically and cyclically or upon query by the first control unit 10. Thus, a bidirectional data exchange is realized. Operating and monitoring cycles of both control units 10, 11 may be the same or different. As intended to provide the entire control system for the crane installation 1, the control unit 10 will normally operate at longer cycles of e.g. 40 ms, whereas the second control unit 11, which merely monitors the first control unit 10 and, if necessary, intervenes in the control system and which receives only safety-relevant signals and thus not all the signals that are sent to the first control unit 10, operates at a cycle of 6 ms, for example. When the second control unit 11 detects an excessive speed of the trolley 6, as the trolley 6 moves past the pre-limit switch 15, a second control element (e.g. a contactor while the control unit 10 controls the inverter/converter 1) is immediately instructed to shut down the drive.

On the other hand, the first control unit 10 is able through continuous supervision to ascertain the signals transmitted normally by sensors etc. to the second control unit 11 and to detect the presence of a defect. When the pre-limit switch signal E significantly drops in a boom area before the pre-limit switch 15, the plausibility check recognizes this as error of the pre-limit switch 15 and triggers an error message for example.

It will be appreciated by persons skilled in the art that FIG. 2 illustrates only an exemplified embodiment. Further safety-relevant shutdowns are certainly conceivable as well such as, e.g., emergency off, emergency halt, emergency limit switch supervision, overload and slack rope supervision of the hoist mechanisms, overload and slack rope supervision of the luffing gear, overspeed supervision of the hoist and luffing gears, collision protection between trolley or load and other objects as well as protection of personnel. Of course, the first and second control unit 10, 11 can be constructed to issue commands no only to one operating element such as converter 13 but may interact with several operating elements if necessary to address a recognized safety situation. This is suitable to prevent problems as a result of an error in an operating element. For example, the control unit 10 may thus act on the converter (or inverter) 13 whereas the control unit 11 act on a contactor associated to the converter 13. In the event the converter 13 has an internal defect, the converter 13 is unable to respond to a command of the control unit 10 (e.g. reduction of a desired value etc.) even though the control unit 10 operates properly. When the error is recognized, the second control unit 11 is able to trigger the safety shutdown via the contactor.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A crane installation for moving a load, comprising:
   an electric or electro-mechanical operating element;
   a first stored-programmable control unit constructed to receive a safety-relevant signal for issuing a control command to control the operating element; and
   a second stored-programmable control unit constructed to at least partially monitor a control operation of the first control unit in response to a received safety-relevant signal and to override the first control unit for controlling the operating element, when the first control unit issues an improper control command,
   wherein the first control unit is constructed for executing a plausibility check of the signal transmitted to the second control unit on the basis of the signal received by the first control unit.

2. The crane installation of claim 1, wherein at least one of the first and second control units is constructed to delay issuance of a control command.

3. The crane installation of claim 1, wherein the first and second control units communicate bidrectionally with one another.

4. The crane installation of claim 1, wherein the first and second control units are constructed for processing at least partially different signals which result in output of a same control command.

5. The crane installation of claim 1, wherein the first control unit is constructed for the plausibility check to execute an operational test of the signal transmitted by the operating element to the second control unit and to output an error message, if required.

6. The crane installation of claim 1, wherein the first control unit is constructed for executing a cyclical plausibility check.

7. The crane installation of claim 6, wherein the cyclical plausibility check has a cycle time between 10 ms and 80 ms.

8. The crane installation of claim 6, wherein the cyclical plausibility check has a cycle time between 30 ms and 50 ms.

9. The crane installation of claim 6, wherein the cyclical plausibility check has a cycle time of 40 ms.

10. The crane installation of claim 1, wherein at least one of the first and second control units is constructed for simulating the signal that triggers a control command by at least the other one of the first and second control units and for checking a response time of the at least other one of the first and second control units as operational test, when the crane installation is switched on.

11. The crane installation of claim 1, wherein the load is a container and the crane installation is a crane container.

* * * * *